United States Patent
Hall

(10) Patent No.: US 10,731,720 B2
(45) Date of Patent: Aug. 4, 2020

(54) METHODS, SYSTEMS, AND MEDIA FOR NON-CONTACT BRAKE PAD WEAR DETERMINATION

(71) Applicant: Rivian IP Holdings, LLC, Plymouth, MI (US)

(72) Inventor: Thomas J. Hall, White Lake, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 331 days.

(21) Appl. No.: 15/881,222

(22) Filed: Jan. 26, 2018

(65) Prior Publication Data

US 2019/0234475 A1    Aug. 1, 2019

(51) Int. Cl.
*F16D 66/02* (2006.01)
*F16D 66/00* (2006.01)

(52) U.S. Cl.
CPC ......... *F16D 66/025* (2013.01); *F16D 66/027* (2013.01); *F16D 2066/003* (2013.01); *F16D 2066/005* (2013.01)

(58) Field of Classification Search
CPC ................ F16D 66/025; F16D 66/027; F16D 2066/003; F16D 2066/005; F16D 66/02; F16D 66/026
See application file for complete search history.

(56) References Cited

U.S. PATENT DOCUMENTS

| | | |
|---|---|---|
| 4,893,242 A | 1/1990 | Rogers et al. |
| 2002/0027387 A1* | 3/2002 | Kubota ................ B60T 13/741 303/20 |

(Continued)

FOREIGN PATENT DOCUMENTS

EP    2101077    9/2009

OTHER PUBLICATIONS

International Search Report and Written Opinion dated Jul. 8, 2019 in International Patent Application No. PCT/US2019/014942.

(Continued)

*Primary Examiner* — Sze-Hon Kong
(74) *Attorney, Agent, or Firm* — Clements Bernard Walker

(57) ABSTRACT

Methods, systems, and media for non-contact brake pad wear determination of one or more brake pads associated with a vehicle are provided. In some embodiments, the method comprises: receiving, at a time point, a pressure measurement indicating a pressure of a brake caliper corresponding to a brake pad of a vehicle at the time point and a brake pedal travel distance of a brake pedal of the vehicle at the time point; receiving, at an additional time point, an additional pressure measurement indicating a pressure of the brake caliper corresponding to the brake pad of the vehicle at the additional time point and an additional brake pedal travel distance of the brake pedal of the vehicle at the additional time point; calculating, a gradient of a function relating the pressure measurement and the additional pressure measurement to the brake pedal travel distance and the additional brake pedal travel distance; determining, a wear amount of the brake pad based on the gradient; and causing, an indication of the wear amount of the brake pad to be presented in a user interface presented on a display associated with the vehicle.

21 Claims, 4 Drawing Sheets

(56) References Cited

U.S. PATENT DOCUMENTS

| | | | | |
|---|---|---|---|---|
| 2002/0104720 A1* | 8/2002 | Borugian | ................ | F16D 65/22 |
| | | | | 188/79.56 |
| 2003/0045989 A1* | 3/2003 | Walenty | ............. | B60T 8/17636 |
| | | | | 701/71 |
| 2003/0062228 A1* | 4/2003 | Ichinose | ............... | B60T 8/4063 |
| | | | | 188/72.3 |
| 2012/0078481 A1* | 3/2012 | Aldrich, III | ........ | B60W 10/184 |
| | | | | 701/70 |
| 2013/0261890 A1* | 10/2013 | Roberts | ................. | F16D 65/568 |
| | | | | 701/36 |
| 2013/0304313 A1* | 11/2013 | Svensson | .............. | B60T 17/221 |
| | | | | 701/34.4 |
| 2015/0176668 A1* | 6/2015 | Miller | ................. | F16D 55/2255 |
| | | | | 701/70 |
| 2015/0330470 A1* | 11/2015 | Siebke | ............... | F16D 55/2255 |
| | | | | 188/1.11 L |
| 2016/0163130 A1* | 6/2016 | Zagajac | ............... | G07C 5/0808 |
| | | | | 701/29.1 |
| 2016/0305501 A1* | 10/2016 | Rehfus | .................... | B60T 17/22 |
| 2017/0028977 A1* | 2/2017 | Duff | ...................... | B60T 17/221 |
| 2017/0217419 A1* | 8/2017 | Yen | .......................... | B60T 7/042 |
| 2018/0126966 A1* | 5/2018 | Crum | ...................... | B60T 7/042 |
| 2018/0265068 A1* | 9/2018 | Heil | ........................ | B60T 17/222 |
| 2019/0016327 A1* | 1/2019 | Heeder | ................. | F16D 66/021 |
| 2019/0084548 A1* | 3/2019 | Ohazulike | ............... | B60T 17/22 |
| 2019/0193698 A1* | 6/2019 | Macpherson | ........... | B60T 8/173 |
| 2019/0225202 A1* | 7/2019 | Juzswik | .................... | B60T 8/34 |
| 2019/0264764 A1* | 8/2019 | Lin | ......................... | G01B 7/06 |
| 2020/0011390 A1* | 1/2020 | Drzevieski | ............. | F16D 51/00 |

OTHER PUBLICATIONS

Mazda, "2014 Mazda 3 Brake Pad Set" Datasheet [online], Buy Auto Parts, Apr. 17, 2014, pp. 1-5, URL: https//www.buyautoparts.com/buynow/2014/Mazda/3/Brake_Pad_Set/70-06677_FLMN.

* cited by examiner

270

Your brake pads are 80% worn. /—272

We estimate that you can drive an additional 10,000 miles with your current brake pads.

FIG. 2C

METHODS, SYSTEMS, AND MEDIA FOR NON-CONTACT BRAKE PAD WEAR DETERMINATION

TECHNICAL FIELD

The disclosed subject matter relates to methods, systems, and media for non-contact brake pad wear determination of one or more brake pads associated with a vehicle.

BACKGROUND

Brake pads are a wearable part of a vehicle's brake system, and need to be replaced when they become worn out. Current approaches for determining brake pad wear, however, tend to merely indicate when brake pads are fully worn, for example, using a brake pad indicator that causes the brakes to squeal when the indicator contacts the brake disc or that causes an indication on a dashboard of the vehicle to be presented. It may be useful for a driver to know a current wear condition of the brake pads before the brake pads are fully worn, for example, to plan for vehicle maintenance. However, it can be difficult to determine a current wear of the brake pads.

Accordingly, it is desirable to provide new methods, systems, and media for non-contact brake pad wear determination of one or more brake pads associated with a vehicle.

SUMMARY

Methods, systems, and media for determining brake pad wear of one or more brake pads associated with a vehicle are provided.

In accordance with some embodiments of the disclosed subject matter, a method for determining brake pad wear of brake pads associated with vehicles is provided, the method comprising: receiving, at a time point using a hardware processor, a pressure measurement indicating a pressure of a brake caliper corresponding to a brake pad of a vehicle at the time point and a brake pedal travel distance of a brake pedal of the vehicle at the time point; receiving, at an additional time point using the hardware processor, an additional pressure measurement indicating a pressure of the brake caliper corresponding to the brake pad of the vehicle at the additional time point and an additional brake pedal travel distance of the brake pedal of the vehicle at the additional time point; calculating, using the hardware processor, a gradient of a function relating the pressure measurement and the additional pressure measurement to the brake pedal travel distance and the additional brake pedal travel distance; determining, using the hardware processor, a wear amount of the brake pad based on the gradient; and causing, using the hardware processor, an indication of the wear amount of the brake pad to be presented in a user interface presented on a display associated with the vehicle.

In some embodiments, the method further comprises presenting a second user interface on the display associated with the vehicle for receiving an indication from a user of the second user interface that a brake pad wear determination process is to begin, wherein receiving the pressure measurement and the brake pedal travel distance is in response to receiving the indication that the brake pad wear determination process is to begin.

In some embodiments, the method further comprises presenting a third user interface on the display associated with the vehicle that presents instructions to a user of the third user interface to apply pressure to the brake pedal of the vehicle, wherein receiving the pressure measurement and the brake pedal travel distance is in response to presenting the third user interface.

In some embodiments, the gradient of the function is calculated in response to determining that the pressure measurement and the additional pressure measurement are within a predetermined range of pressures.

In some embodiments, the wear amount of the brake pad is based on a model of vehicle associated with the vehicle.

In some embodiments, the method further comprises associating a braking profile with an operator of the vehicle, wherein the indication of the wear amount of the brake pad includes a number of miles until the brake pad requires replacement that is estimated based on the associated braking profile.

In some embodiments, a plurality of brake pads is associated with the vehicle and the indication of the wear amount is provided for the brake pad from the plurality of brake pads having a greatest wear amount.

In accordance with some embodiments of the disclosed subject matter, a system for determining brake pad wear of brake pads associated with vehicles is provided, the system comprising a memory and a hardware processor that, when executing computer-executable instructions stored in the memory, is configured to: receive, at a time point, a pressure measurement indicating a pressure of a brake caliper corresponding to a brake pad of a vehicle at the time point and a brake pedal travel distance of a brake pedal of the vehicle at the time point; receive, at an additional time point, an additional pressure measurement indicating a pressure of the brake caliper corresponding to the brake pad of the vehicle at the additional time point and an additional brake pedal travel distance of the brake pedal of the vehicle at the additional time point; calculate, a gradient of a function relating the pressure measurement and the additional pressure measurement to the brake pedal travel distance and the additional brake pedal travel distance; determine, a wear amount of the brake pad based on the gradient; and cause, an indication of the wear amount of the brake pad to be presented in a user interface presented on a display associated with the vehicle.

In accordance with some embodiments of the disclosed subject matter, a non-transitory computer-readable medium containing computer executable instructions that, when executed by a hardware processor of a server device, cause the hardware processor to perform a method for determining brake pad wear of brake pads associated with vehicles is provided, the method comprising: receiving, at a time point, a pressure measurement indicating a pressure of a brake caliper corresponding to a brake pad of a vehicle at the time point and a brake pedal travel distance of a brake pedal of the vehicle at the time point; receiving, at an additional time point, an additional pressure measurement indicating a pressure of the brake caliper corresponding to the brake pad of the vehicle at the additional time point and an additional brake pedal travel distance of the brake pedal of the vehicle at the additional time point; calculating, a gradient of a function relating the pressure measurement and the additional pressure measurement to the brake pedal travel distance and the additional brake pedal travel distance; determining, a wear amount of the brake pad based on the gradient; and causing, an indication of the wear amount of the brake pad to be presented in a user interface presented on a display associated with the vehicle.

In accordance with some embodiments of the disclosed subject matter, a system for determining brake pad wear of brake pads associated with vehicles is provided, the system comprising: means for receiving, at a time point, a pressure measurement indicating a pressure of a brake caliper corresponding to a brake pad of a vehicle at the time point and a brake pedal travel distance of a brake pedal of the vehicle at the time point; means for receiving, at an additional time point, an additional pressure measurement indicating a pressure of the brake caliper corresponding to the brake pad of the vehicle at the additional time point and an additional brake pedal travel distance of the brake pedal of the vehicle at the additional time point; means for calculating, a gradient of a function relating the pressure measurement and the additional pressure measurement to the brake pedal travel distance and the additional brake pedal travel distance; means for determining, a wear amount of the brake pad based on the gradient; and means for causing, an indication of the wear amount of the brake pad to be presented in a user interface presented on a display associated with the vehicle.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 2A-2C show examples of user interfaces for non-contact brake pad wear determination of one or more brake pads associated with a vehicle in accordance with some embodiments of the disclosed subject matter.

DETAILED DESCRIPTION

In accordance with various embodiments, mechanisms (which can include methods, systems, and media) for non-contact brake pad wear determination of one or more brake pads associated with a vehicle are provided.

In some embodiments, the mechanisms described herein can determine an amount of wear on one or more brake pads of a vehicle (e.g., a car, and/or any other suitable type of vehicle). In some embodiments, the mechanisms can determine an amount of wear on the brake pads by instructing a driver of the vehicle to apply pressure to a brake pedal. During the application of force and/or pressure to the brake pedal, the mechanisms can then measure a pressure of a brake caliper corresponding to each brake pad and a brake pedal travel distance. The mechanisms can then determine a brake pad wear for each brake pad based on the pressure of the corresponding brake caliper and the brake pedal travel distance using any suitable technique or combination of techniques. For example, in some embodiments, the mechanisms can determine, for each brake pad, a gradient or slope of a function that relates brake caliper pressure to brake pedal travel distance. In some embodiments, the mechanisms can determine the brake pad wear for each brake pad based on the gradient or the slope of the function.

In some embodiments, the mechanisms can present an indication of the brake pad wear of each brake pad associated with a vehicle in any suitable manner. For example, in some embodiments, the mechanisms can present a user interface that indicates an amount of wear of each brake pad (e.g., a notification can state on a vehicle display that "the brake pad associated with your front left and front right wheels are approximately 20% worn"). In some embodiments, the mechanisms can additionally or alternatively cause any other suitable information to be presented, such as an estimated number of miles that can be driven by the vehicle based on current brake system usage before the brake pads should be replaced, and/or any other suitable information.

Figure 1:
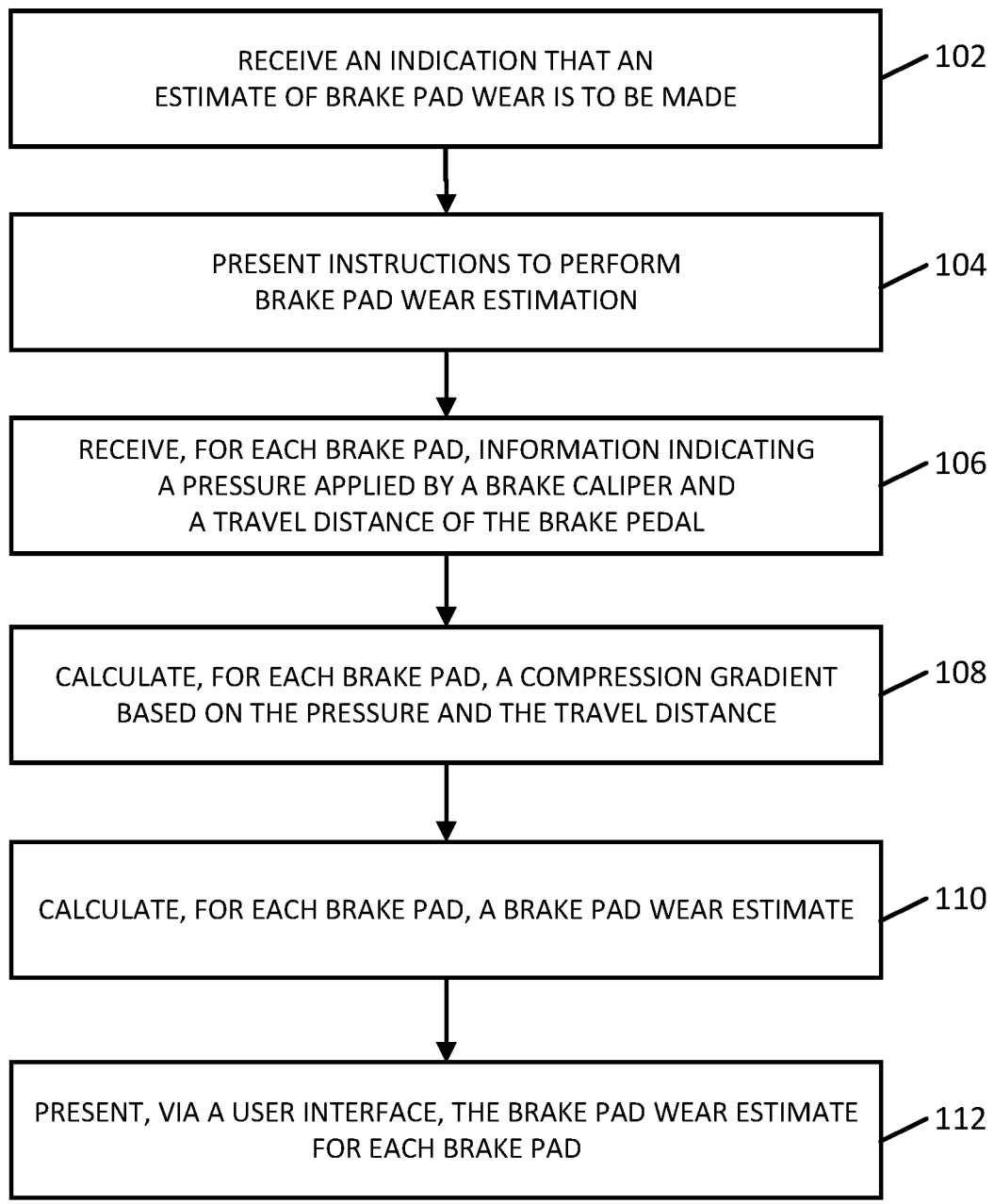
FIG. 1 shows an example of a process for non-contact brake pad wear determination of one or more brake pads associated with a vehicle in accordance with some embodiments of the disclosed subject matter.

Turning to FIG. 1, an example 100 of a process for non-contact brake pad wear determination of one or more brake pads associated with a vehicle is shown in accordance with some embodiments of the disclosed subject matter. In some embodiments, process 100 can be executed by a vehicle computer, such as a computer associated with a car.

Figure 2A:
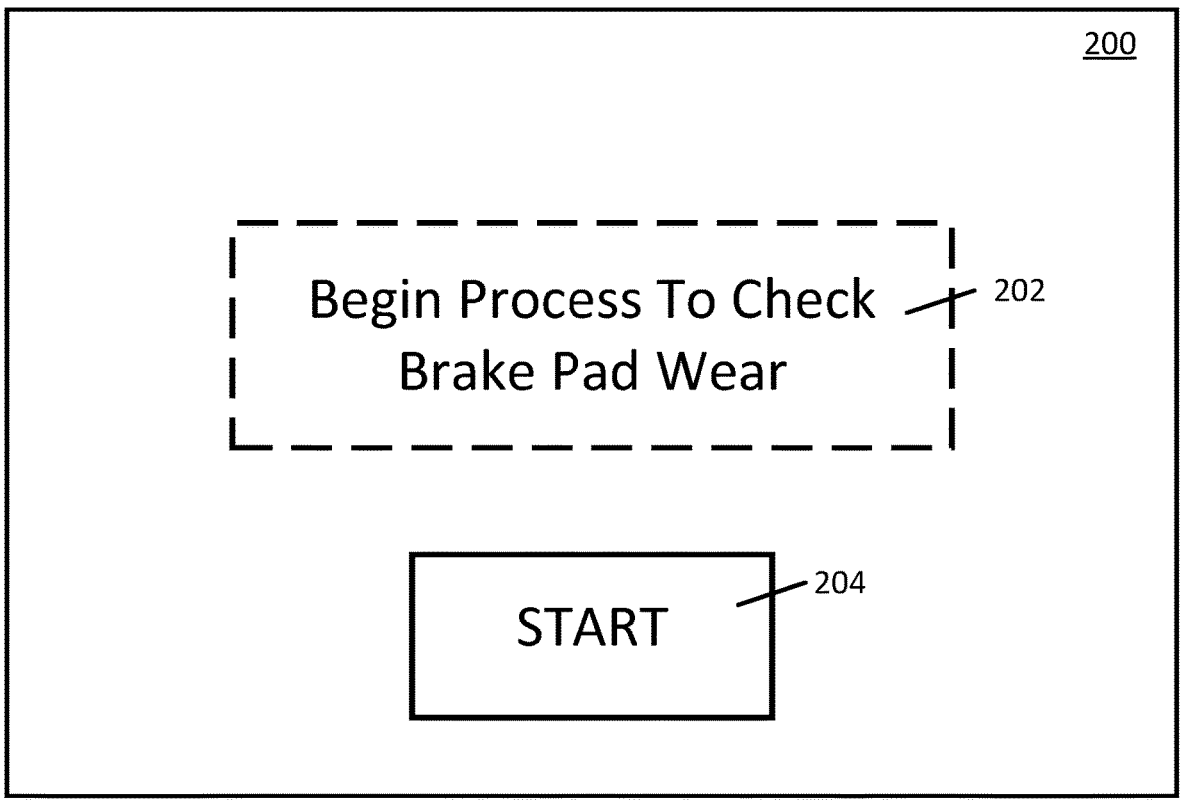

Process 100 can begin at 102 by receiving an indication that a determination of brake pad wear is to be made. In some embodiments, process 100 can receive the indication based on any suitable information. For example, in some embodiments, the indication can be received via a user interface as shown in FIG. 2A. Turning to FIG. 2A, an example of a user interface 200 for initiating a brake pad wear determination process of one or more brake pads associated with a vehicle is shown in accordance with some embodiments of the disclosed subject matter. As illustrated, in some embodiments, user interface 200 can present a message 202 and a selectable input 204. In some embodiments, selection of input 204 can cause a brake pad wear determination process to begin. In some embodiments, user interface 200 can be presented in any suitable manner, such as on a vehicle information display located on a dashboard or console of a car, and/or in any other suitable manner.

In some embodiments, process 100 can be initiated at particular times—e.g., after a vehicle has been driven a particular number of miles, after a particular amount of time has elapsed, etc. For example, in response to the vehicle computer determining that a mileage indicator exceeds a given threshold value (e.g., 10,000 miles), the determination of brake pad wear can be initiated. In another example, in response to the vehicle computer determining that a vehicle has completed a particular number of charge cycles, the determination of brake pad wear can be initiated.

Figure 2B:
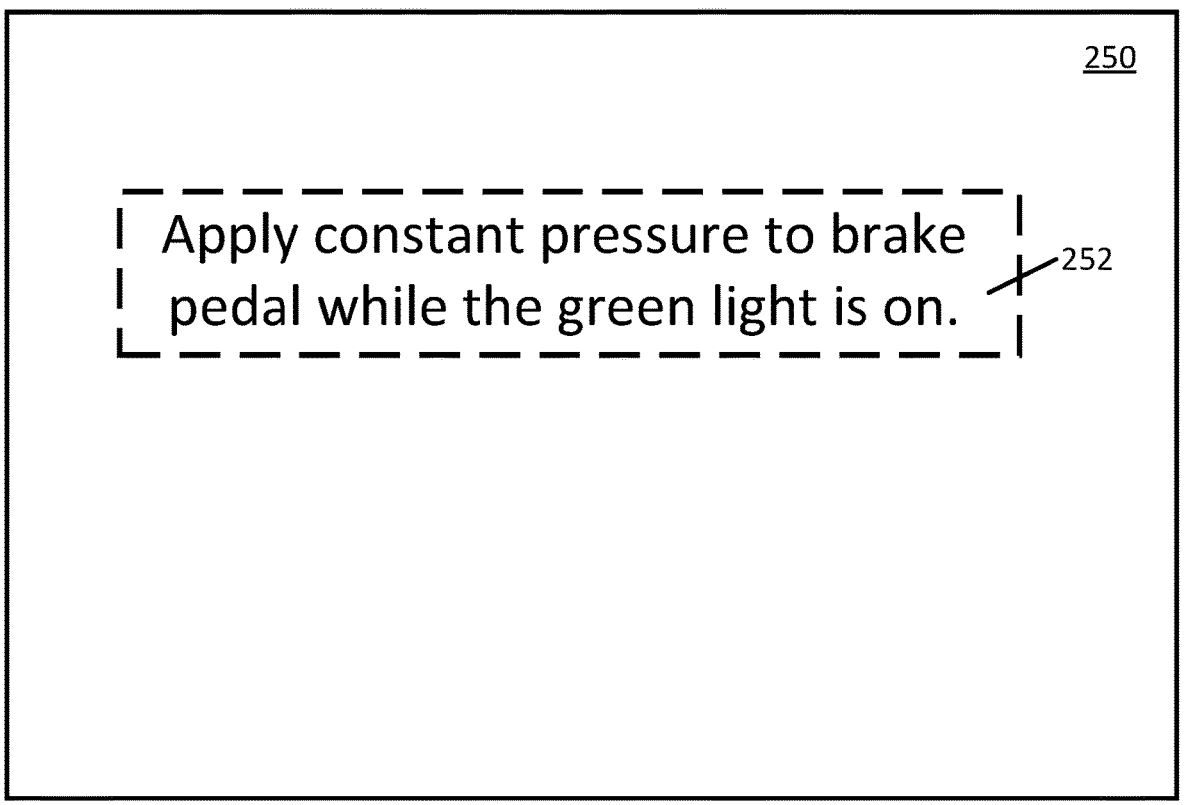

At 104, process 100 can present instructions to a driver or operator of the vehicle to provide input for the brake pad wear determination process, for example, by applying pressure to the brake pedal of the vehicle to engage the braking system. In some embodiments, the instructions can be presented in any suitable manner, such as via a user interface, as shown in user interface 250 of FIG. 2B. As illustrated in FIG. 2B, user interface 250 can include a message 252, which can instruct the driver to, for example, apply constant pressure to a brake pedal of the vehicle for a predetermined period of time (e.g., two seconds, five seconds, and/or any other suitable period of time). Additionally or alternatively, in some embodiments, message 252 can instruct the driver to apply force and/or pressure to the brake pedal while an indicator light is on or while an indicator light is a particular color (e.g., green, red, and/or any other suitable color), as shown in FIG. 2B. In continuing these examples, the user interfaces can provide indications as to the status of the brake pad wear determination process—e.g., that measurements needed to determine brake pad wear for the brake pads associated with the vehicle have been received based on the current application of pressure to the brake pedal.

At 106, process 100 can receive and/or generate, for each brake pad, measurements that indicate pressures applied by a brake caliper corresponding to a brake pad and brake pedal travel distances. In some embodiments, each brake caliper pressure measurement can be associated with a corresponding brake pedal travel distance. For example, in some embodiments, process 100 can receive, at a first time point, a first brake caliper pressure measurement for one brake pad of the vehicle and a first brake pedal travel distance. Continuing with this example, in some embodiments, process 100 can receive, at a second time point, a second brake caliper pressure measurement for the brake pad and a second brake pedal travel distance. In some embodiments, process 100 can pair brake caliper pressure measurements and brake pedal travel distances based on a time the measurements were made. For example, measurements can be paired in a format such as: [(20 bars, 45 millimeters); (40 bars, 50 millimeters); (50 bars, 60 millimeters)], indicating brake caliper pressure measurements and brake pedal travel distances, respectively, measured at three different time points. In some embodiments, process 100 can measure, for each brake pad, any suitable number of brake caliper pressure measurements and brake pedal travel distances for each brake pad. For example, in some embodiments, process 100 can receive measurements at any suitable frequency (e.g., once per millisecond, once per ten milliseconds, and/or any other suitable frequency) over any suitable time period (e.g., one second, two seconds, and/or any other suitable time period.

In some embodiments, a brake caliper pressure can be measured in any suitable manner. For example, in some embodiments, a brake caliper pressure can be measured by any suitable sensor or gauge. As a more particular example, in some embodiments, a brake caliper pressure can be measured by a load cell, a strain gauge, and/or any other suitable type of sensor. In some embodiments, the brake caliper pressure can be in any suitable units (e.g., bars, pounds per square inch, or PSI, and/or in any other suitable units).

In some embodiments, brake pedal travel distance can be measured in any suitable manner. For example, in some embodiments, process 100 can determine the brake pedal travel distance based on a magnitude of motion of the brake pedal during application of the brake pedal by the driver of the vehicle. As a more particular example, in some embodiments, process 100 can determine the brake pedal travel distance using any suitable type of sensor or other hardware component located on the brake pedal and/or the input or output rod of the brake booster and/or the master cylinder piston(s) and/or the caliper piston(s). As a specific example, in some embodiments, process 100 can determine the brake pedal travel distance using an encoder located on the brake pedal, and process 100 can translate an angle of motion around a hinge point of the brake pedal to a brake pedal travel distance (e.g., in millimeters, and/or in any other suitable metric). As another example, in some embodiments, process 100 can determine the brake pedal travel distance based on a stroke distance of a master cylinder of the brake system resulting from application of the brake pedal. As a more particular example, in some embodiments, process 100 can determine the stroke distance of the master cylinder of the brake system using any suitable type of sensor located on the master cylinder, booster, and/or caliper, and can translate the stroke distance of the master cylinder to a brake pedal travel distance in any suitable manner (e.g., based on the pedal ratio, and/or in any other suitable manner).

Note that, in some embodiments, process 100 can measure brake caliper pressure measurements for each brake pad in any suitable manner. For example, in some embodiments, process 100 can measure brake caliper pressure measurements for each brake pad simultaneously, that is, for all brake pads of the vehicle during a single application of the brake pedal by a driver of the vehicle. As another example, in some embodiments, process 100 can measure brake caliper pressure measurements for each brake pad sequentially. In some such embodiments, process 100 can present the instructions to perform brake pad wear estimation once for each brake pad (e.g., FIG. 2B, as described above in connection with block 104).

Additionally, note that, in some embodiments, process 100 can begin collecting and/or receiving brake caliper pressure measurements and/or brake pedal travel distances in response to any suitable indication. For example, in some embodiments, process 100 can begin collecting and/or receiving the measurements in response to receiving an indication that a brake pad wear determination process is to begin (e.g., in response to determining that input 204 of user interface 200 has been selected, and/or based on any other suitable indication). As another example, in some embodiments, process 100 can begin collecting and/or receiving the measurements in response to determining that a user interface presenting instruction to apply pressure to a brake pedal has been presented (e.g., user interface 250 of FIG. 2B, as described above in connection with block 104). As yet another example, in some embodiments, process 100 can begin collecting and/or receiving the measurements in response to determining that a driver of the vehicle has begun applying pressure to the brake pedal after presentation of user interface 250 of FIG. 2B.

At 108, process 100 can calculate, for each brake pad, a compression gradient based on the brake caliper pressure measurements and the brake pedal travel distances, as described above in connection with block 106. In some embodiments, process 100 can calculate the compression gradient using any suitable technique or combination of techniques. For example, in some embodiments, process 100 can construct a function of brake pedal travel distances as a function of brake caliper pressure measurements using pairs of brake caliper pressure measurements and brake pedal travel distances, as described above in connection with block 106. As a more particular example, using the example given above in connection with block 106, the function can be specified by the points: [(20 bars, 45 millimeters); (40 bars, 50 millimeters); (50 bars, 60 millimeters)], and/or any other suitable brake caliper pressure measurements and corresponding brake pedal travel distances measured at any suitable number of time points. In some such embodiments, process 100 can then calculate a slope or gradient for the function. For example, in some embodiments, the slope or gradient can indicate a change in brake pedal travel distance as a function of change in caliper pressure. As a more particular example, in some embodiments, the slope or gradient can be in millimeters/bar (e.g., 0.5 millimeters/bar, 0.4, millimeters/bar, and/or any other suitable slope or gradient).

In some embodiments, process 100 can calculate the compression gradient for any suitable subset of the function. For example, in some embodiments, process 100 can calculate the compression gradient for a portion of the function that has a linear relationship between brake pedal travel distance and brake caliper pressure. As another example, in some embodiments, process 100 can calculate the compression gradient for a portion of the function with brake caliper pressure measurements within a predetermined range (e.g., between 20 and 80 bars, between 30 and 70 bars, and/or any other suitable range). As yet another example, in some embodiments, process 100 can calculate the compression gradient for a portion of the function with brake caliper pressure measurements above and/or below a predetermined threshold (e.g., greater than 20 bars, less than 90 bars, and/or any other suitable pressure threshold).

It should be noted that any suitable number of data points can be received and/or generated to calculate the compression gradient. For example, based on a desired accuracy level, process 100 can generate and/or select a particular number of data points for calculating the compression gradient.

At 110, process 100 can calculate, for each brake pad, a brake pad wear amount based on the compression gradient. In some embodiments, process 100 can calculate the brake pad wear using any suitable technique or combination of techniques. For example, in some embodiments, process 100 can use a formula that takes as an input a compression gradient (as described above in connection with block 108) for a brake pad and that produces an amount of brake pad wear as an output. In some embodiments, the brake pad wear estimate can be in any suitable units, such as percentage (e.g., 70% worn, 80% worn, and/or any other suitable percentage). In some embodiments, a formula used to estimate brake pad wear can be based on any suitable information. For example, in some embodiments, process 100 can select a particular formula based on any suitable information, such as a material of the brake pad (e.g., ceramic, metal alloy, and/or any other suitable material), a vehicle manufacturer or vehicle model, and/or any other suitable information. As a more particular example, in some embodiments, process 100 can select the formula for correlating brake pad wear to compression gradient using a database that indicates correlations for different vehicle manufacturers, different brake pad materials, and/or any other suitable factors.

Note that, in some embodiments, process 100 can calculate any other suitable metrics based on the brake pad wear estimate. For example, in some embodiments, process 100 can calculate a number of miles that can be driven using the current set of brake pads. For example, in an instance where process 100 determines that at least one brake pad is 80% worn, and that the vehicle has been driven 40,000 miles with the current set of brake pads, process 100 can determine that the vehicle can be driven another 10,000 miles. Note that, in instances where a brake pad wear estimate differs across multiple brake pads of the vehicle, process 100 can calculate the number of miles that can be driven using the current set of brake pads using the brake pad wear amount of the most worn brake pad.

As another example, in some embodiments, process 100 can estimate a date in the future at which the brake pads will likely need to be replaced based on the current brake pad wear. For example, in an instance where process 100 determines that at least one brake pad is 75% worn, and that the current brake pads have been used for nine months, process 100 can estimate that the brake pads will need to be replaced three months from a current date. Note that, in instances where a brake pad wear estimate differs across multiple brake pads of the vehicle, process 100 can estimate a date at which the brake pads will likely need to be replaced based on the brake pad wear of the most worn brake pad.

As yet another example, in some embodiments, process 100 can identify a user type associated with a driver of the vehicle based on metrics associated with brake pad wear. For example, in some embodiments, process 100 can categorize the driver into a category from a group of categories indicating how heavily the driver causes the brake pads to be worn. As a more particular example, in some embodiments, process 100 can categorize the driver into categories such as "light braking profile," "typical braking profile," "heavy braking profile," and/or any other suitable categories. In some embodiments, the category can be determined based on any suitable information, such as an estimate of a number of miles driven on a current set of brake pads. For example, in some embodiments, if the estimate of the number of miles driven on the current set of brake pads is within a first predetermined range (e.g., between 20,000 and 50,000 miles, and/or any other suitable range), the category can be assigned as "heavy braking profile," whereas if the estimate of number of miles is within a second predetermined range (e.g., between 50,000 and 70,000 miles, above 70,000 miles, and/or any other suitable range), the category can be assigned as "light braking profile." In some embodiments, process 100 can cause any suitable calculated metrics and a category associated with the driver to be stored in any suitable manner. For example, in some embodiments, process 100 can cause the information to be transmitted to any suitable database, which can aggregate brake pad wear information across multiple drivers. In some such embodiments, aggregate information across multiple drivers can be used to modify techniques used to estimate brake pad wear. For example, in some embodiments, aggregated information can be used to modify a function used to determine brake pad wear from a compression gradient, as described above. Additionally, in some embodiments, a function to determine brake pad wear can be modified based on category information associated with the driver, for example, by adjusting the function for drivers assigned to a "heavy braking profile" category differently than for drivers assigned to a "light braking profile" category.

At 112, process 100 can present a user interface that indicates the brake pad wear determination for each brake pad. Turning to FIG. 2C, an example 270 of a user interface for indicating brake pad wear is shown in accordance with some embodiments of the disclosed subject matter. As illustrated, in some embodiments, user interface 270 can include a message 272 that indicates a current wear of the brake pads. In some embodiments, message 272 can indicate a brake pad wear for each brake pad of the vehicle.

Note that, in some embodiments, process 100 can include any other suitable information in the user interface. For example, as described above in connection with block 110, process 100 can present any other metrics calculated. As a more particular example, in some embodiments, process 100 can present an indication of a remaining number of miles that can be driven using a current set of brake pads. As a specific example, process 100 can present a message that states "we estimate you can drive an additional 10,000 miles with your current brake pads." As another more particular example, in some embodiments, process 100 can present a message that indicates a date in the future at which the brake pads will likely need to be changed, such as "remember to get your brake pads changed by January 1," and/or any other suitable message. In some such embodiments, a user interface that presents a message indicating a date brake pads will need to be changed can include a selectable input, that, when selected, allows a user of the user interface to schedule an appointment (e.g., by transmitting appointment information to a service center associated with the vehicle, and/or in any other suitable manner). For example, in some embodiments, the user interface can state "Select 'yes' to schedule appointment to change your brake pads before January 1," and/or any other suitable information. In another example, in an instance where process 100 determines that at least one brake pad is worn greater than a particular threshold value (e.g., 95% worn), a user interface that presents a message that advises the operator of the vehicle to bring the vehicle to a service technician for replacement of the worn brake pads can be provided. As yet another more particular example, in some embodiments, process 100 can present an indication of a total number of miles that will have been driven using the current set of brake pads at a time when the brake pads are 100% worn, such as "you will have driven 50,000 miles using the current set of brake pads." In some such embodiments, process 100 can additionally present an indication of a total number of miles that an average driver would have accumulated on a set of brake pads, thereby indicating whether a driver of the vehicle is harder or more gentle on the brakes relative to an average driver.

As another example, in some embodiments, process 100 can present a coupon or advertisement for a store or repair shop for replacing worn brake pads. As a more particular example, in some embodiments, process 100 can present the coupon or the advertisement in response to determining that brake pad wear exceeds a predetermined threshold (e.g., greater than 80% wear, greater than 90% wear, and/or any other suitable threshold).

In some embodiments, in response to determining the location information associated with the vehicle corresponds to a service technician, process 100 can transmit brake pad wear estimate information, brake caliper pressure measurements, brake pedal travel distance measurements, compression gradient information, and/or any other suitable brake pad information to a computing device associated with the service technician.

Note that, in some embodiments, process 100 can determine information to be included in the user interface and/or a time at which the user interface is to be presented based on any suitable information, such as a wear amount of the brake pads. For example, in instances where process 100 determines that brake pad wear is less than a predetermined threshold (e.g., less than 50%, less than 30%, and/or any other suitable threshold) and/or that more than a predetermined threshold of miles can be driven using the current set of brake pads (e.g., more than 10,000 miles, more than 20,000 miles, and/or any other suitable threshold), process 100 can present a user interface that indicates a wear amount of the brake pads and/or an estimate of a number of miles remaining. Continuing with this example, in some embodiments, process 100 can determine that the user interface is to be presented in response to the brake pad wear estimate process completing. As another example, in instances where process 100 determines that brake pad wear is greater than a predetermine threshold (e.g., greater than 70%, greater than 80%, and/or any other suitable threshold) and/or that fewer than a predetermined threshold of miles can be driven using the current set of brake pads (e.g., fewer than 10,000, fewer than 5,000, and/or any other suitable threshold), process 100 can determine that the user interface is to present a wear amount of the brake pads as well as a reminder to schedule an appointment to change the brake pads by a particular date. Continuing with this example, in some embodiments, process 100 can determine that a user interface presenting information relating to brake pad wear is to be shown at any suitable time as a reminder to a driver of the vehicle, for example, every time the vehicle is started until a driver of the vehicle schedules an appointment to change the brake pads, while the vehicle is being driven (e.g., every hundred miles, and/or at any other suitable time points), and/or at any other suitable times.

Note that, although brake pad wear determination is generally described herein as being initiated in response to an indication from a driver of a vehicle (e.g., received via a user interface, as shown in FIG. 2A and described above in connection with block 102), in some embodiments, process 100 can determine brake pad wear in real-time as a vehicle is operated. For example, in some embodiments, process 100 can receive a group of brake caliper measurements and corresponding brake pedal travel distances (as described above in connection with block 106) during application of the brake pedal during normal operation of the vehicle. In some such embodiments, blocks 102 and 104 of process 100 can be omitted. Additionally, in some such embodiments, process 100 can present indications of brake pad wear at any suitable time, such as a next time the vehicle is turned on, and/or at any other suitable time.

Figure 3:
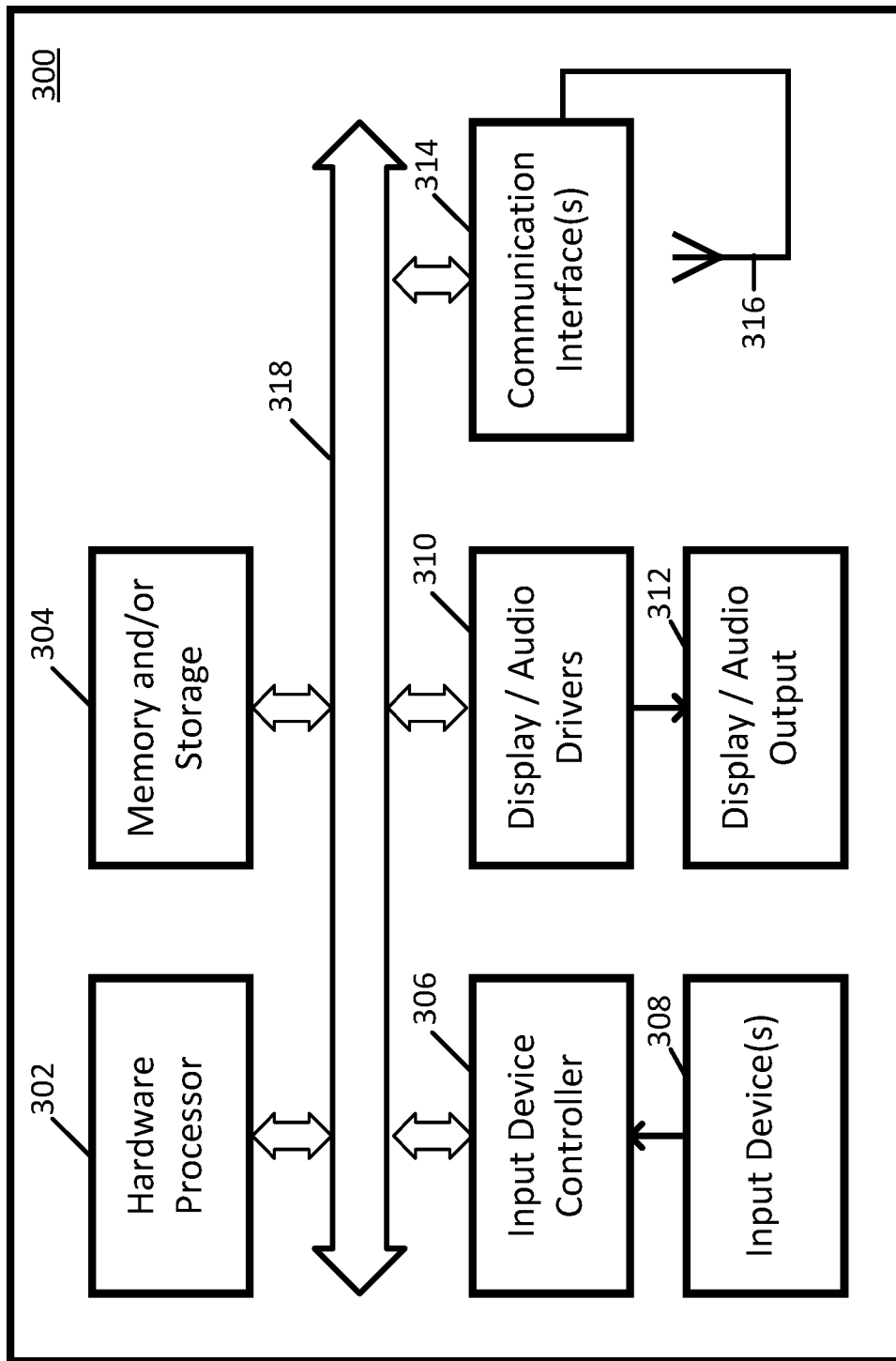
FIG. 3 shows a detailed example of hardware that can be used in a vehicle to estimate brake pad wear of one or more brake pads associated with the vehicle in accordance with some embodiments of the disclosed subject matter.

In some embodiments, a vehicle that uses the mechanisms described herein to determine brake pad wear can use any suitable general purpose computer or special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a computer program stored in memory and/or storage 304. For example, the computer program can cause hardware processor 302 to present a user interface instructing a user to apply pressure to a brake pedal, determine brake pad wear, and/or perform any other suitable functions.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks. For example, interface(s) 314 can include network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

In some embodiments, at least some of the above described blocks of the process of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for non-contact brake pad wear determination of one or more brake pads associated with a vehicle are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for determining brake pad wear of brake pads associated with vehicles, the method comprising:
 receiving, at a time point during a predetermined period of time during which a brake pedal of the vehicle is depressed, using a hardware processor, a pressure measurement indicating a pressure of a brake caliper corresponding to a brake pad of a vehicle at the time point and a brake pedal travel distance of the brake pedal of the vehicle at the time point;
 receiving, at an additional time point during the predetermined period of time during which the brake pedal of the vehicle is depressed, using the hardware processor, an additional pressure measurement indicating a pressure of the brake caliper corresponding to the brake pad of the vehicle at the additional time point and an additional brake pedal travel distance of the brake pedal of the vehicle at the additional time point;
 calculating, using the hardware processor, a gradient of a function relating the pressure measurement and the additional pressure measurement to the brake pedal travel distance and the additional brake pedal travel distance;
 determining, using the hardware processor, a wear amount of the brake pad based on the gradient; and
 causing, using the hardware processor, an indication of the wear amount of the brake pad to be presented in a user interface presented on a display associated with the vehicle.

2. The method of claim 1, further comprising presenting a second user interface on the display associated with the vehicle for receiving an indication from a user of the second user interface that a brake pad wear determination process is to begin, wherein receiving the pressure measurement and the brake pedal travel distance is in response to receiving the indication that the brake pad wear determination process is to begin.

3. The method of claim 1, further comprising presenting a third user interface on the display associated with the vehicle that presents instructions to a user of the third user interface to apply pressure to the brake pedal of the vehicle for the predetermined period of time, wherein receiving the pressure measurement and the brake pedal travel distance is in response to presenting the third user interface.

4. The method of claim 1, wherein the gradient of the function is calculated in response to determining that the pressure measurement and the additional pressure measurement are within a predetermined range of pressures.

5. The method of claim 1, wherein determining the wear amount of the brake pad further comprises accessing a database containing correlation information between a plurality of vehicle models and a plurality of brake pad materials, and wherein the wear amount is determined based on the correlation information.

6. The method of claim 1, further comprising associating a braking profile with an operator of the vehicle, wherein the indication of the wear amount of the brake pad includes a number of miles until the brake pad requires replacement that is estimated based on the associated braking profile.

7. The method of claim 1, wherein a plurality of brake pads is associated with the vehicle and the indication of the wear amount is provided for the brake pad from the plurality of brake pads having a greatest wear amount.

8. A system for determining brake pad wear of brake pads associated with vehicles, the system comprising:
 a memory; and
 a hardware processor that, when executing computer-executable instructions stored in the memory, is configured to:
 receive, at a time point during a predetermined period of time during which a brake pedal of the vehicle is depressed, a pressure measurement indicating a pressure of a brake caliper corresponding to a brake pad of a vehicle at the time point and a brake pedal travel distance of the brake pedal of the vehicle at the time point;

receive, at an additional time point during the predetermined period of time during which the brake pedal of the vehicle is depressed, an additional pressure measurement indicating a pressure of the brake caliper corresponding to the brake pad of the vehicle at the additional time point and an additional brake pedal travel distance of the brake pedal of the vehicle at the additional time point;

calculate, a gradient of a function relating the pressure measurement and the additional pressure measurement to the brake pedal travel distance and the additional brake pedal travel distance;

determine, a wear amount of the brake pad based on the gradient; and cause, an indication of the wear amount of the brake pad to be presented in a user interface presented on a display associated with the vehicle.

9. The system of claim 8, wherein the hardware processor is further configured to present a second user interface on the display associated with the vehicle for receiving an indication from a user of the second user interface that a brake pad wear determination process is to begin, wherein receiving the pressure measurement and the brake pedal travel distance is in response to receiving the indication that the brake pad wear determination process is to begin.

10. The system of claim 8, wherein the hardware processor is further configured to present a third user interface on the display associated with the vehicle that presents instructions to a user of the third user interface to apply pressure to the brake pedal of the vehicle for the predetermined period of time, wherein receiving the pressure measurement and the brake pedal travel distance is in response to presenting the third user interface.

11. The system of claim 8, wherein the gradient of the function is calculated in response to determining that the pressure measurement and the additional pressure measurement are within a predetermined range of pressures.

12. The system of claim 8, wherein determining the wear amount of the brake pad further comprises accessing a database containing correlation information between a plurality of vehicle models and a plurality of brake pad materials, and wherein the wear amount is determined based on the correlation information.

13. The system of claim 8, wherein the hardware processor is further configured to associate a braking profile with an operator of the vehicle, wherein the indication of the wear amount of the brake pad includes a number of miles until the brake pad requires replacement that is estimated based on the associated braking profile.

14. The system of claim 8, wherein a plurality of brake pads is associated with the vehicle and the indication of the wear amount is provided for the brake pad from the plurality of brake pads having a greatest wear amount.

15. A non-transitory computer-readable medium containing computer executable instructions that, when executed by a processor of a server device, cause the hardware processor to perform a method for determining brake pad wear of brake pads associated with vehicles, the method comprising:

receiving, at a time point during a predetermined period of time during which a brake pedal of the vehicle is depressed, a pressure measurement indicating a pressure of a brake caliper corresponding to a brake pad of a vehicle at the time point and a brake pedal travel distance of the brake pedal of the vehicle at the time point;

receiving, at an additional time point during the predetermined period of time during which the brake pedal of the vehicle is depressed, an additional pressure measurement indicating a pressure of the brake caliper corresponding to the brake pad of the vehicle at the additional time point and an additional brake pedal travel distance of the brake pedal of the vehicle at the additional time point;

calculating, a gradient of a function relating the pressure measurement and the additional pressure measurement to the brake pedal travel distance and the additional brake pedal travel distance;

determining, a wear amount of the brake pad based on the gradient; and causing, an indication of the wear amount of the brake pad to be presented in a user interface presented on a display associated with the vehicle.

16. The non-transitory computer-readable medium of claim 15, wherein the method further comprises presenting a second user interface on the display associated with the vehicle for receiving an indication from a user of the second user interface that a brake pad wear determination process is to begin, wherein receiving the pressure measurement and the brake pedal travel distance is in response to receiving the indication that the brake pad wear determination process is to begin.

17. The non-transitory computer-readable medium of claim 15, wherein the method further comprises presenting a third user interface on the display associated with the vehicle that presents instructions to a user of the third user interface to apply pressure to the brake pedal of the vehicle for the predetermined period of time, wherein receiving the pressure measurement and the brake pedal travel distance is in response to presenting the third user interface.

18. The non-transitory computer-readable medium of claim 15, wherein the gradient of the function is calculated in response to determining that the pressure measurement and the additional pressure measurement are within a predetermined range of pressures.

19. The non-transitory computer-readable medium of claim 15, wherein determining the wear amount of the brake pad further comprises accessing a database containing correlation information between a plurality of vehicle models and a plurality of brake pad materials, and wherein the wear amount is determined based on the correlation information.

20. The non-transitory computer-readable medium of claim 15, wherein the method further comprises associating a braking profile with an operator of the vehicle, wherein the indication of the wear amount of the brake pad includes a number of miles until the brake pad requires replacement that is estimated based on the associated braking profile.

21. The non-transitory computer-readable medium of claim 15, wherein a plurality of brake pads is associated with the vehicle and the indication of the wear amount is provided for the brake pad from the plurality of brake pads having a greatest wear amount.

* * * * *